United States Patent [19]

Lundin

[11] Patent Number: 5,242,627
[45] Date of Patent: Sep. 7, 1993

[54] CONTACT BODIES FOR LIQUID AND GAS

[75] Inventor: Sven A. Lundin, Ft. Myers, Fla.

[73] Assignee: Munters Corporation, Fort Myers, Fla.

[21] Appl. No.: 941,247

[22] Filed: Sep. 4, 1992

[51] Int. Cl.⁵ .............................................. B01F 3/04
[52] U.S. Cl. ................................................. 261/112.2
[58] Field of Search .................................... 261/112.2

[56] References Cited

U.S. PATENT DOCUMENTS

| | | | |
|---|---|---|---|
| 1,823,269 | 9/1931 | Grilli | 261/112.2 |
| 3,262,682 | 7/1966 | Bredberg | 261/112.2 |
| 3,738,626 | 6/1973 | Norback | 261/112.2 |
| 3,785,914 | 1/1974 | King | 261/112.2 |
| 3,792,841 | 2/1974 | Munters | 261/112.2 |
| 3,801,419 | 4/1974 | Meek | 261/112.2 |
| 4,157,929 | 6/1979 | Kubicek | 261/112.2 |
| 5,013,492 | 5/1991 | Gay et al. | 261/112.2 |
| 5,143,658 | 9/1992 | Thomas | 261/112.2 |

FOREIGN PATENT DOCUMENTS 1058077 5/1959 Fed. Rep. of Germany ... 261/112.2

*Primary Examiner*—Tim Miles
*Attorney, Agent, or Firm*—Fitzpatrick, Cella, Harper & Scinto

[57] ABSTRACT

A gas liquid contact body for use in a gas liquid contact apparatus is disclosed which consists of at least first and second sets of corrugated sheets with the sheets in the first set being disposed alternately with the sheets of the second set. The corrugations in the first set of sheets extend vertically in the contact body and the corrugations in the second set extend at an angle to the corrugations of the first set. The passageways formed between the inclined corrugations and the vertical corrugations serve to distribute air and water evenly through the contact body and avoid clogging thereof.

13 Claims, 4 Drawing Sheets

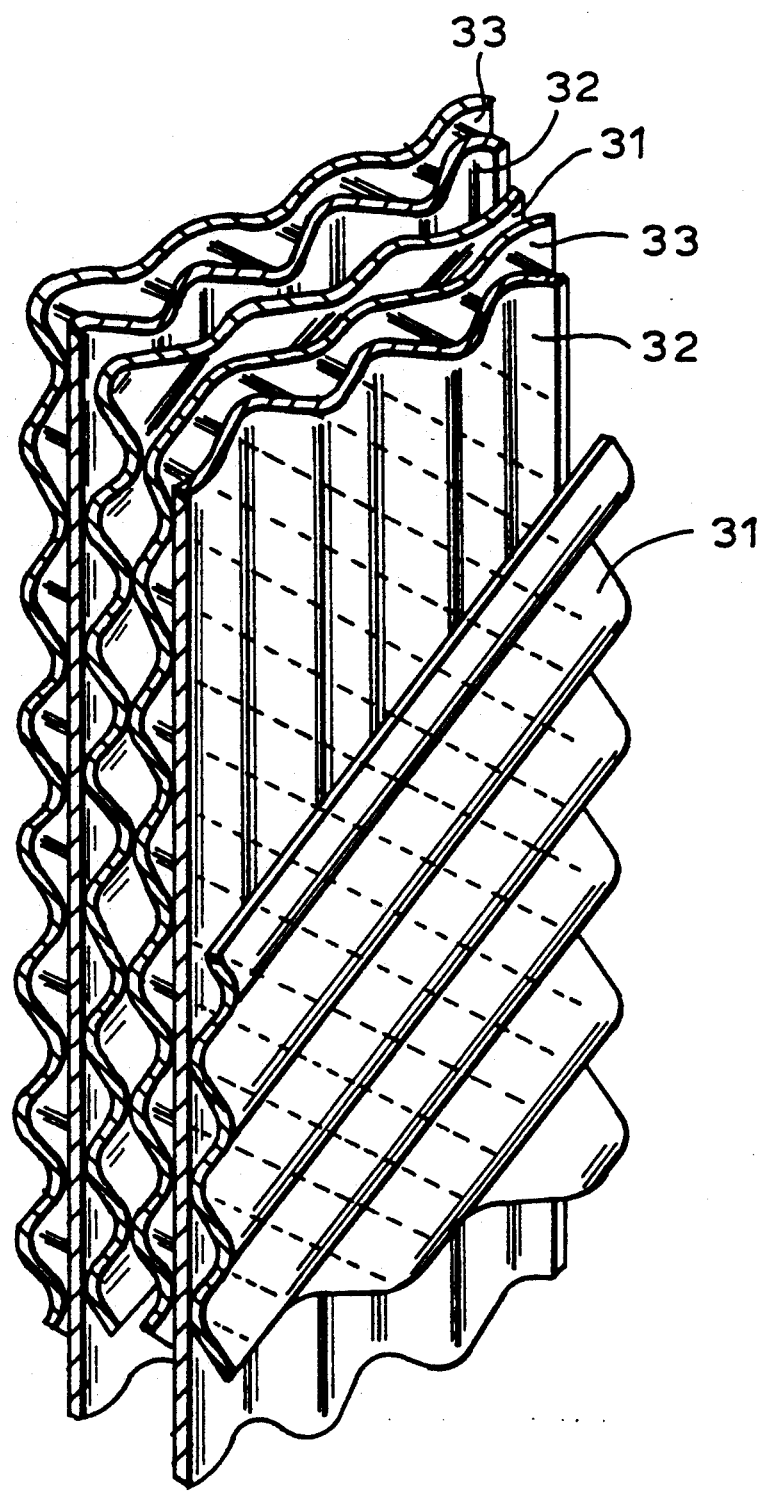
F I G. 4

CONTACT BODIES FOR LIQUID AND GAS

BACKGROUND OF THE INVENTION

The present invention relates to an improved contact body for use in a liquid and gas contact apparatus and, in particular, to a contact body formed of alternating corrugated sheets of material.

Contact bodies or packings for gas and liquid contact apparatus such as, for example, cooling towers, have been previously proposed in which the contact body is formed of adjacent corrugated sheets of material. Corrugated sheets are placed adjacent one another with their ridges or crests contacting each other so that channels or passageways are formed between the sheets to provide continuously varying width passages in the sheets which result in the flow direction of the gas and liquid being repeatedly changed during passage through the body. It has been found that contact bodies of this type are highly efficient in operation. One such contact body is shown in U.S. Pat. No. 3,262,682 to Bredberg. This type of cross fluted contact body is commonly used in cooling structures such as shown, for example, in U.S. Pat. No. 5,013,492. This Munters' type pack or contact body has been highly successful in use and generally accepted as a cooling tower medium where fairly large volumes of water are recirculated over it.

In cooling towers in which the Munters', type of contact body has normally been used, a water recirculating system is typically provided. In such systems a certain amount of water is normally bled off from the system in order to keep salts and suspended solids in the water from exceeding certain concentrations due to evaporation. A source of makeup water provides fresh water to makeup for evaporation and bleed-off. However, due to restrictions on water usage, bleed-off levels have been reduced, raising the levels of salts and suspended solids in the recirculating water. As a result, the openings between the sheets become plugged by a combination of hardness salts, biological growth, silt, and other suspended materials in the water. The plugging is exacerbated by the fact that the amplitude heights of the corrugations in the pack are generally made relatively small and oriented angularly in the sheet in order to increase the retention time of the descending water and the cooling efficiency of the contact body. One solution to this problem has been to provide contact bodies with relatively large amplitude heights in their corrugations in order to increase the size of the passageways. However, this results in a reduction of the available contact surface for water and air and considerably less cooling.

OBJECT OF THE INVENTION

It is an object of the present invention to provide an improved contact body which has improved ability to maintain the passageways in the body clear while sacrificing little of the cooling efficiency.

Another object of the invention is to provide a contact body which reduces the pressure drop of gas through the body to save on power requirements while sacrificing little of the efficiency.

Yet another object of the invention is to provide a further improvement of contact bodies of the type described in the above-mentioned Bredberg and Munters patents.

SUMMARY OF THE INVENTION

In accordance with an aspect of the present invention, a contact body for use in a liquid gas contact apparatus such as a cooling tower is provided in which the gas and liquid flow in counter-current relationship to one another. The contact body is composed of at least first and second sets of corrugated sheets having corrugations disposed in a direction transversely of the horizontal plane of the contact body. The sheets of the first set are disposed alternately with the sheets of the second set, with the corrugations of the first set extending vertically and crossing the corrugations of the second set. The corrugations of the first set of sheets extend from the lower air inlet edge of the contact body to the upper air outlet edge thereof and cooperate with the corrugations of the second set to define passageways penetrating from end to end of the contact body. The corrugations of the corrugated sheets bear against one another so that the sheets touch where the crests of their respective corrugations cross whereby the passageways vary in width from zero at the places of contact between the sheets to a maximum width defined by the amplitude of the corrugations. The improvement provided by the present invention includes providing sheets in the fill pack whose corrugations extend vertically. By this arrangement the liquid will descend faster on the sheet with the vertical corrugations than on the adjacent sheets with slanted corrugations. This produces a flushing action which will prevent buildups of suspended solids such as silt and mud.

In one embodiment the slanted corrugations of the sheets in one set are formed with a smaller amplitude than the vertical corrugations of the other set, thereby enlarging the passages and increasing the flushing action.

The above and other objects, features and advantage of this invention will be apparent in the following detailed description of an illustrative embodiment thereof, which is to be read in connection with the accompanying drawings, wherein:

FIG. 4 is a perspective view of yet another embodiment of the invention; and

Figure 1:
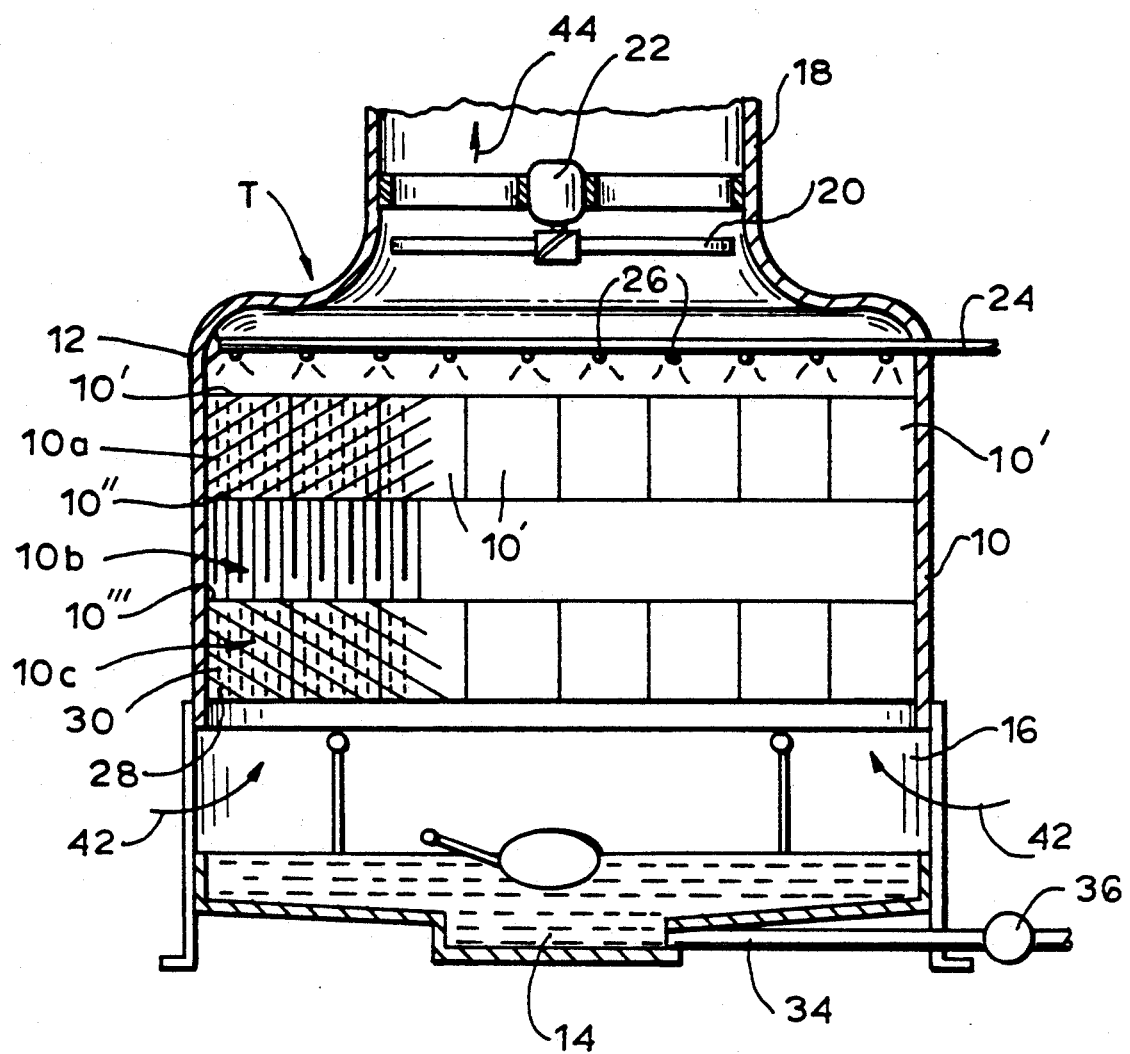
FIG. 1 is a vertical longitudinal schematic section through a gas-liquid contact apparatus or cooling tower provided with contact bodies made according to the present invention.
Figure 2:
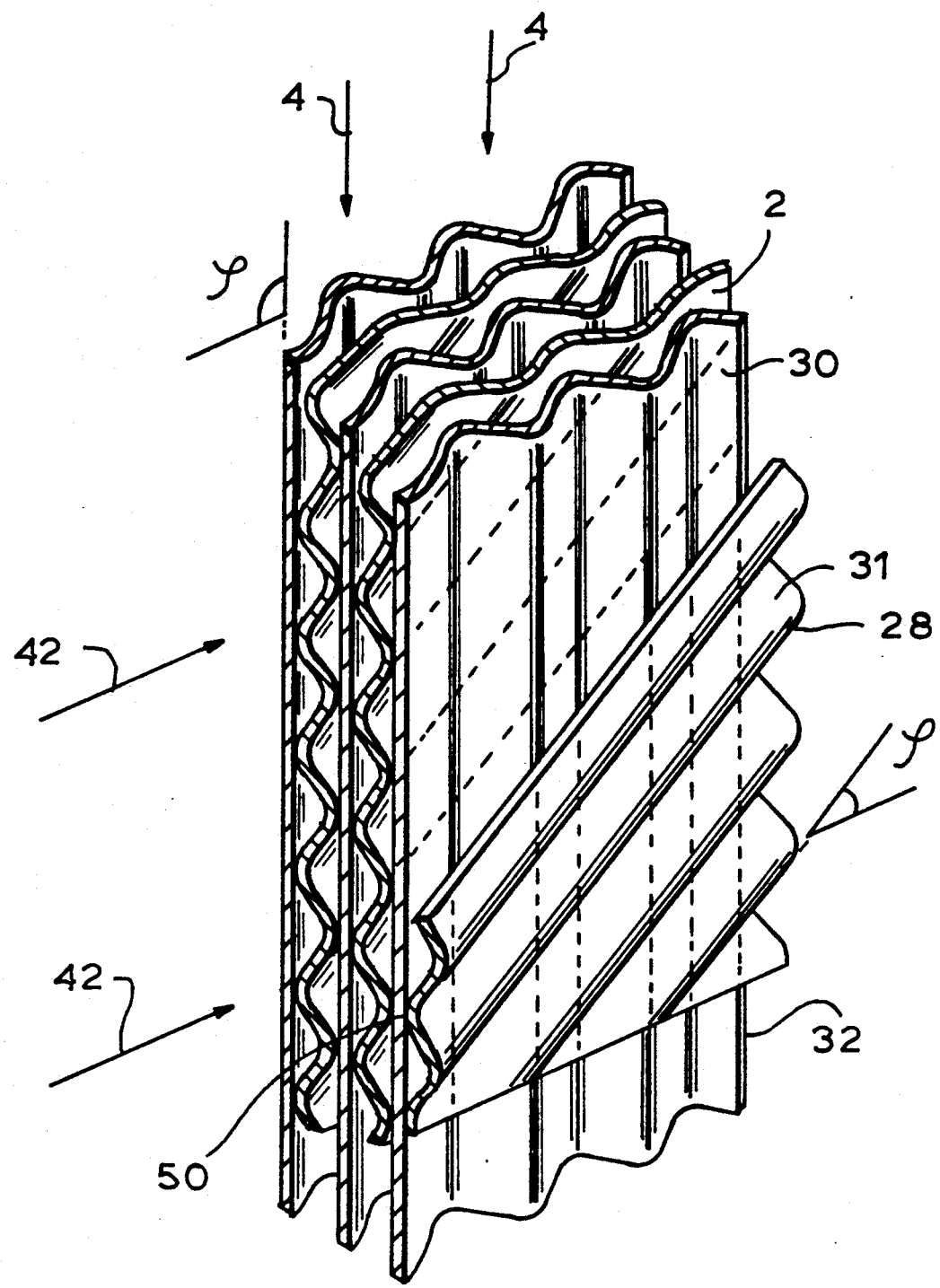
FIG. 2 is a perspective view of a portion of a contact body made in accordance with one embodiment of the present invention.

Referring now to the drawing in detail, and initially to FIGS. 1 and 2, a cooling tower T is disclosed which is similar to the cooling tower structure shown in U.S. Pat. No. 5,013,492. Cooling tower T contains a contact body 10 mounted in a housing or enclosure 12 whose bottom forms a water collecting basin 14. Housing 12 has openings 16 formed therein for admittance of air which passes in an upward direction through the contact body 10 and escapes through an outlet 18 within which a fan 20 with a motor 22 is provided.

Water is supplied to the contact body 10 from above through a distributor 24, or the like. For ease of illustration, distributor 24 has been shown as a stationary device or pipe with escape hole 26 on the lower side.

However, a variety of different liquid distributing arrangements can be used in cooling towers as are known to those skilled in the art.

Contact body 10 is formed of a plurality of individually formed packs or bodies. In the illustrative embodiment three layers 10a, 10b, and 10c of such packs $10^I$, $10^{II}$, $10^{III}$ are provided, stacked upon one another. Each pack is formed of a plurality of thin layers or sheets, which preferably are folded or corrugated and which are positioned vertically. The folds or corrugations cross one another and bear against one another at their points of contact where they are bonded together by means of a suitable bonding agent. The lines 28 denote the corrugations in every second sheet 31 and the dotted lines 30 denote the corrugations in the sheets 32 therebetween (in the left pack in FIG. 1 only one pair of lines is shown for ease of illustration). In FIG. 2, one of the sheets 31 is broken away for illustrative purposes to illustrate the next adjacent sheet 32 having the corrugations 30 therein.

Figure 5:
FIG. 5 is an end view of a corrugated sheet of the invention illustrating the shape of the corrugations.

The corrugated sheets 31 form channels or passageways with sheets 32 that penetrate from the lower end to the upper end of the contact body and produce both horizontal and vertical components of direction. The sheets 32 form vertical passageways in the contact body helping to distribute liquid from one set of passageways to another. The passageways have a continuously varying width from zero at the points of contact 50 between the sheets up to the maximum sum of the amplitudes of the corrugations. The amplitudes h of the sheets in each set (See FIG. 5) may have same heights or amplitudes (e.g. 5 to 30 mm) so that the passageways have a maximum height of double the amplitudes of the corrugations. Preferably, the amplitudes of the corrugations in the two sets may be different. For example, the corrugations in sheets 32 may be larger than those of the sheets 31, or vice versa. These larger corrugations help prevent clogging in the contact body.

Preferably, the corrugated sheets 31, 32 of the contact body are formed of a cellulosic material or a plastic material as is known in the art.

The water distributed from above over the top of the contact body flows downwardly along both sides of the sheets forming the contact body as a film, following a winding path in order to obtain a very high rate of interaction between the fluids per unit of surface of the layers. When the water flows down in the form of a thin film along the layers in a substantially vertical direction of flow, gas, e.g., air, enters through the openings 16 in casing 12 as indicated by the arrows 42 into the casing and flows vertically through the passageways formed in the contact body countercurrent to the water. The air escapes through an outlet 18 within which the fan 20 is provided. The water is withdrawn from the collecting space 14 through conduit 34 controlled by a valve 36 to be recirculated in a known manner to the distributor 24.

As is known in the art, some of the water may be bled off as it becomes contaminated and makeup water can be added to the circulatory flow as necessary. In addition, the level of water in the collector can be controlled by a float mechanism 38 causing fresh water to be supplied to replace losses due to evaporation within the contact body.

Each contact body pack is turned 90° with respect to the pack immediately therebelow. Thus the sheets in the packs $10^I$ of layer 10a extend transversely of the sheets in packs $10^{II}$ of layer 10b, while the sheets in pack $10^{II}$ of layer 10b extend transversely of the sheets in packs $10^{III}$ of layer 10c. As a result, the paths of travel of air and gas in the contact body changes at the interfaces between the packs.

Figure 3:
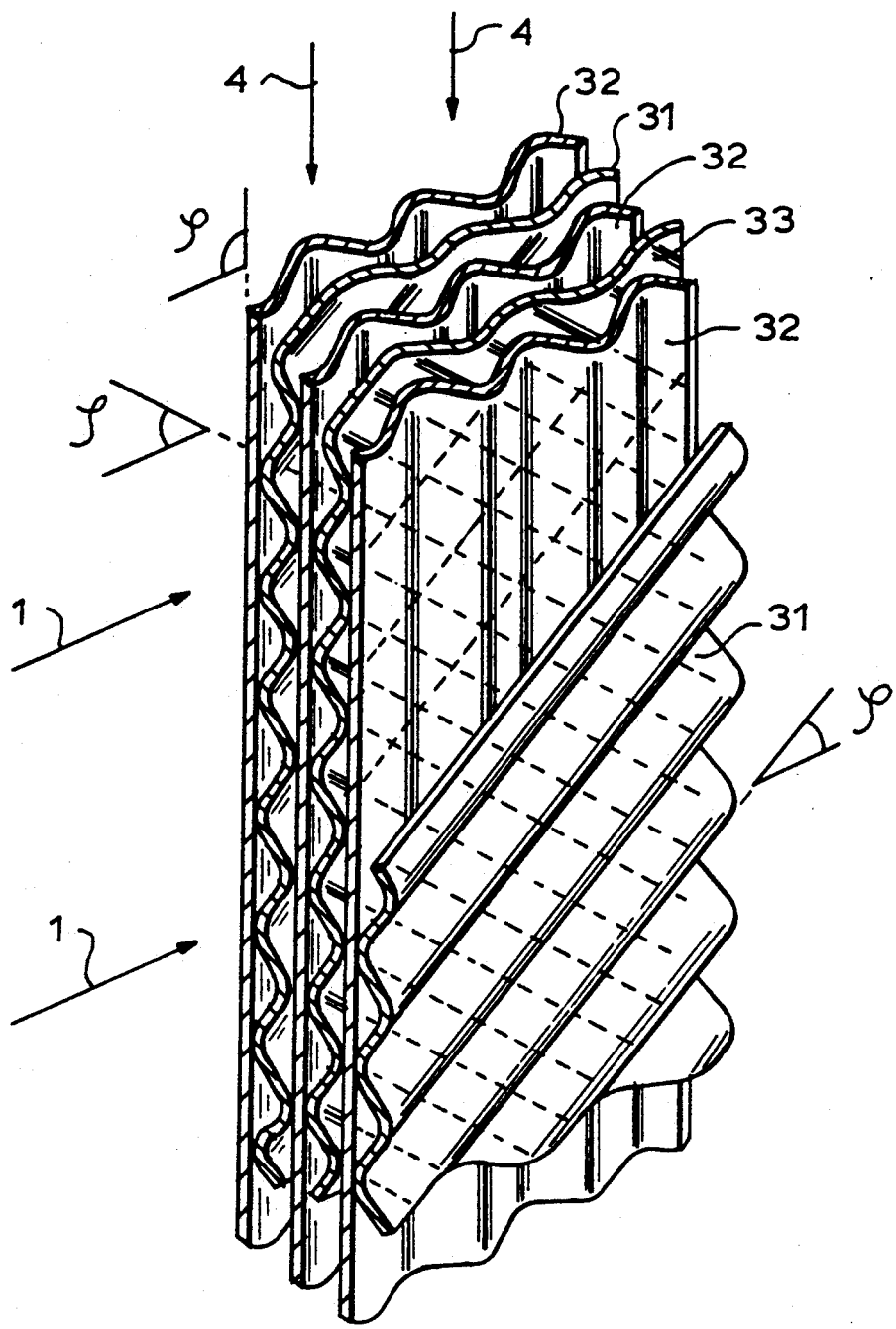
FIG. 3 is a perspective view similar to FIG. 2 of another embodiment of the present invention.

In another embodiment of the invention, the individual packs are formed of three sets of sheets, as illustrated in FIG. 3. In this embodiment, the third set of sheets 33 are corrugated like sheets 31, but the sheets are arranged with the corrugations extending in an opposite direction but at the same or different angles from the corrugations of sheets 31.

Preferably, the three sets of sheets 31, 32 and 33 described above with respect to FIG. 3 are arranged in the order illustrated in FIG. 4, wherein sheet 31 is followed by the vertically corrugated sheet 32, which in turn is followed by the oppositely corrugated sheet 33 and then by another sheet 31. As a result, periodically through the contact body a sheet 31 is in contact with and engages the sheet 33. This arrangement and relationship of the sheets with the additional interspersing of vertically corrugated sheets aids in reducing the tendency of clogging of the fill material.

Preferably, the angle of inclination of the corrugations relative to the horizontal plane may be from 45° to 70° for the corrugations, or 20° to 45° from the vertical.

By arranging the contact body sheets in this manner, the film of water passing over the sheets will move downwardly faster on the sheets with the vertical corrugations than on the sheets with the slanted corrugations, thereby producing a flushing action which will prevent buildups of suspended solids in the passages.

In the embodiments of FIGS. 3 and 4, as in previously described embodiments, the amplitudes or heights of the corrugations can be varied between the sheets. In particular, for example, the sheets 31, 33 can have corrugations of the same amplitude while the vertically corrugated sheets 32 can have a greater amplitude. That amplitude can be varied as desired and may be twice that of sheets 31, 33. The enlarged passageways provided by this arrangement together with the vertical corrugations of sheets 32 will serve to prevent clogging.

Preferably, as illustrated for example in FIG. 2 and in the layer 10b in FIG. 1, the vertically corrugated sheets may be formed of a greater length than the cross-corrugated sheets so that they extend beyond the bottom edges of the cross-corrugated sheets. The vertically corrugated sheets therefore will provide support for the pack on the fill layer below it. The vertically corrugated sheets will also provide a dewatering edge for the sheets with the slanted corrugations. This enhances the flushing action of the water at the interface between fill layers where clogging is likely to occur.

Although the present invention has been described herein in detail in connection with the accompanying drawings, it is to be understood that various changes and modifications may be affected therein by those skilled in the art without departing from the scope or spirit of this invention.

I claim:

1. A gas-liquid contact body for use in a gas-liquid contact apparatus, said contact body having upper and lower ends, and opposed side ends, and said body comprising at least first and second sets of corrugated sheets with the sheets of said first set of sheets being disposed alternately with the sheets of said second set and wherein the corrugations in said first set of sheets extend vertically in said contact body and the corrugations in said second set extend at an angle to the corrugations of the first set to define passageways penetrating from side to side of the body; and a third set of corrugated sheets in said body, the corrugations in said third set extending at an angle to the corrugations in the first set and in an opposite direction to the corrugations in the sheets of the second set, with the sheets in the first set being located between the sheets of the second and third sets.

2. A gas-liquid contact body as defined in claim 1, wherein the corrugations of said sheets have the same amplitude.

3. A gas-liquid contact body as defined in claim 1 wherein the amplitude of the corrugations in said first set of sheets is different from the amplitude of the corrugations in said second set of sheets.

4. A gas-liquid contact body as defined in claim 1 wherein the sheets of said first set are larger than the sheets of the second set and extend below the bottom edges of the sheets of said second set in said body.

5. A contact body for use in a gas and liquid contact apparatus in which the gas and the liquid flow in countercurrent relationship to one another, said body having upper and lower ends and opposed sides and said body comprising first and second sets of corrugated sheets, said first set of sheets being disposed alternately with the sheets of the second set, with the corrugations of the second set crossing the corrugations of the first set; said corrugations of the second set defining passageways penetrating from side to side of the body, the corrugations of said corrugated sheets bearing against one another so that the sheets touch where the crests of their respective corrugations cross, the corrugations of the first set extending vertically and the corrugations of the second set of sheets being inclined to the vertical and at an angle to the horizontal.

6. A gas-liquid contact body as defined in claim 5, wherein the corrugations of said sheets have the same amplitude.

7. A gas-liquid contact body as defined in claim 5 wherein the amplitude of the corrugations in said first set of sheets is different from the amplitude of the corrugations in said second set of sheets.

8. A gas-liquid contact body as defined in claim 5 wherein the sheets of said first set are larger than the sheets of the second set and extend below the bottom edges of the sheets of said second set in said body.

9. A contact body for use in a gas and liquid contact apparatus in which the gas and the liquid flow in countercurrent relationship with one another, said contact body having upper and lower ends and opposed sides and said body comprising first, second and third sets of corrugated sheets having corrugations disposed in a direction transversely of the horizontal plane of the contact body, said sheets sets being disposed in a repetitive predetermined sequence of sheets consisting of a sheet from the first set, a sheet from the second set and a sheet from said third set, with the corrugations of the second set extending vertically in said body and the corrugations of said first and third sets crossing the corrugations of the second set and defining passageways penetrating from side to side of said body, said corrugations of said sheets bearing against one another so that the corrugations touch where the crests of their respective corrugations cross; and wherein the corrugations of said first and third sets are nonsymmetrical.

10. A contact body as defined in claim 9, wherein the corrugations of the first set of sheets have a greater inclination to the horizontal plane than the corrugations in the third set of sheets.

11. A gas-liquid contact body as defined in claim 9, wherein the corrugations of said sheets have the same amplitude.

12. A gas-liquid contact body as defined in claim 9 wherein the amplitude of the corrugations in said first and third sets of sheets is different from the amplitude of the corrugations in said second set of sheets.

13. A gas-liquid contact body as defined in claim 9 wherein the sheets of said second set are wider than the sheets of the first and third sets and extend below the bottom edges of the sheets in said first and second sets.

* * * * *